(12) United States Patent
Pengelley (10) Patent No.: US 10,885,911 B2
(45) Date of Patent: Jan. 5, 2021

(54) VOICE ENDPOINT TO CHATBOT BRIDGE INTERFACE

(71) Applicant: salesforce.com, inc., San Francisco, CA (US)

(72) Inventor: David Pengelley, Riverstone (AU)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/132,265

(22) Filed: Sep. 14, 2018

(65) Prior Publication Data

US 2020/0090649 A1   Mar. 19, 2020

(51) Int. Cl.
*G10L 15/22* (2006.01)
*H04L 12/58* (2006.01)
*G10L 15/30* (2013.01)
*G10L 15/26* (2006.01)

(52) U.S. Cl.
CPC ............... *G10L 15/22* (2013.01); *G10L 15/26* (2013.01); *G10L 15/30* (2013.01); *H04L 51/02* (2013.01); *G10L 2015/223* (2013.01)

(58) Field of Classification Search
CPC ......... G10L 15/22; G10L 15/26; G10L 15/08; G10L 2015/228; G10L 15/00; G10L 15/04; G10L 15/19; G10L 15/193; G10L 15/18; G10L 15/1822; G10L 25/63; G10L 17/06; G10L 2015/088; G10L 21/0272; G10L 21/10; G10L 25/48; G10L 13/00; G10L 13/033; G10L 15/14; G10L 17/22; G10L 2015/025; G10L 2015/027; G10L 2015/223; G10L 21/06; G10L 25/51; G10L 25/54; G10L 13/02; G10L 13/04; G10L 13/08; G10L 15/16; G10L 15/1815; G10L 15/187; G10L 15/222; G10L 15/30; G10L 2015/227; G10L 21/00; G10L 25/21; G10L 25/30; G10L 25/57
USPC ......................................................... 704/235
See application file for complete search history.

(56) References Cited

U.S. PATENT DOCUMENTS

| | | | | |
|---|---|---|---|---|
| 2007/0043878 | A1* | 2/2007 | Carlson | ................. H04L 51/066 709/246 |
| 2018/0309805 | A1* | 10/2018 | Robbins | ................... G10L 15/26 |
| 2019/0012390 | A1* | 1/2019 | Nishant | ................. G06F 16/248 |
| 2019/0197457 | A1* | 6/2019 | Chan | .................... G06Q 30/016 |

* cited by examiner

*Primary Examiner* — Bharatkumar S Shah
(74) *Attorney, Agent, or Firm* — Sterne, Kessler, Goldstein & Fox P.L.L.C.

(57) ABSTRACT

Disclosed herein are device, system and method embodiments for implementing a voice endpoint to chatbot bridge interface system. A bridge interface device operates by receiving query text corresponding to audio information captured at a voice endpoint, generating a bot agent request based on the query text and a bot agent associated with the query text, and sending the bot agent request to the bot agent. Further, the bridge interface device receives a bot agent response including response information associated with the query text, and sends a query response to the voice endpoint based on the bot agent response.

17 Claims, 4 Drawing Sheets

VOICE ENDPOINT TO CHATBOT BRIDGE INTERFACE

BACKGROUND

Many consumers have begun to integrate virtual personal assistants into their daily lives. Often consumers rely on virtual personal assistants to perform voice based search via web services configured to interface with personal assistant cloud servers. In addition, many businesses have begun to utilize chatbots in customer service workflows to provide immediate assistance to consumers. However, it would be impractical for chatbot operators to maintain web service interfaces compatible with the plurality of models and/or types of virtual personal assistants.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing a voice endpoint to chatbot bridge interface system.

Figure 1:
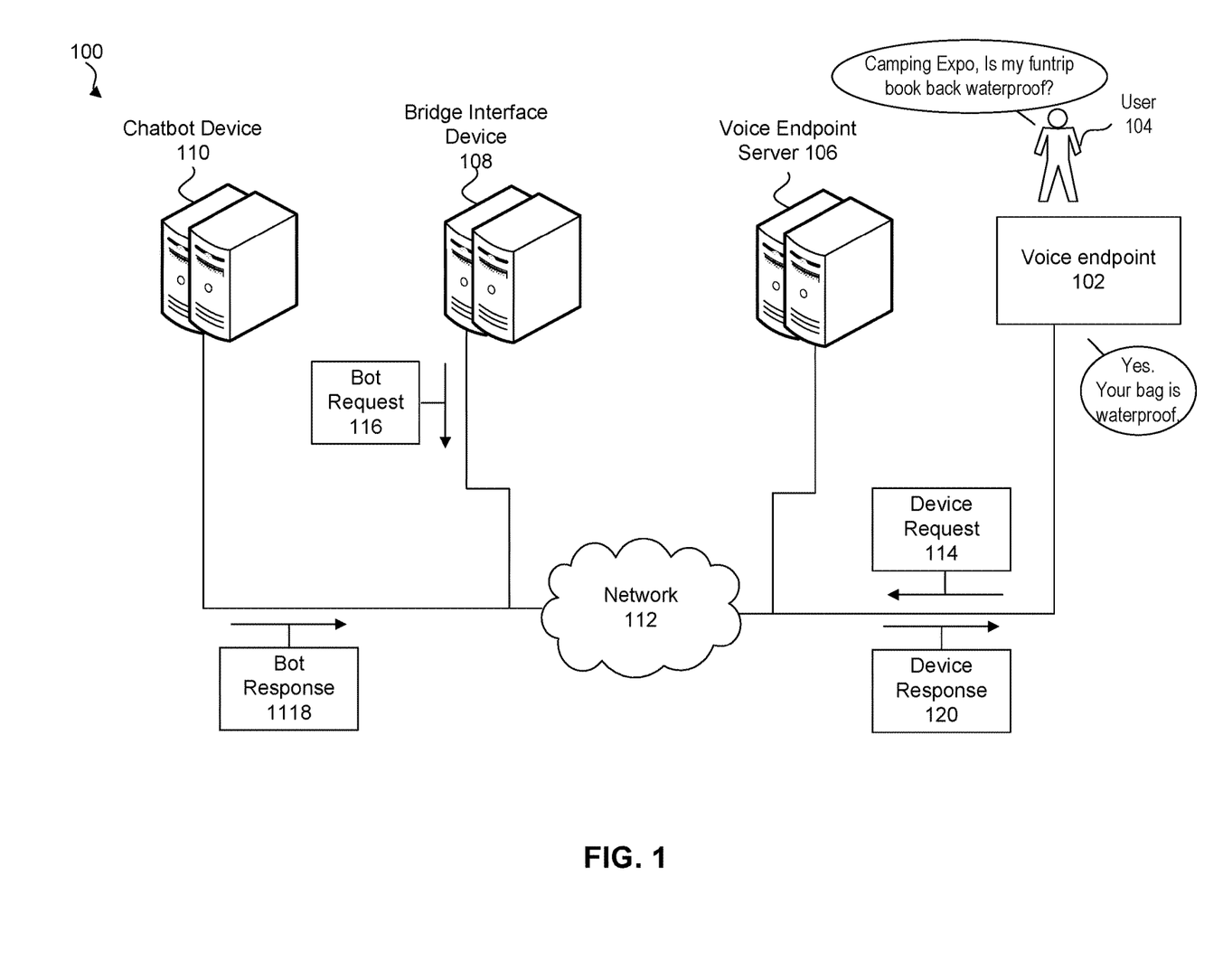
FIG. 1 illustrates a block diagram of an example framework for implementing a voice endpoint to chatbot bridge interface system, according to some embodiments.

FIG. 1 illustrates a block diagram of an example framework for implementing a voice endpoint to chatbot bridge interface system, according to some embodiments. As illustrated in FIG. 1, the system 100 includes a voice endpoint device 102 associated with a user 104, a voice endpoint server 106, a bridge interface device 108, and a chatbot server 110. Additionally, the voice endpoint device 102, the voice endpoint server 106, the bridge interface device 108, and the chatbot server 110 may communicate via a communication network(s) 112. The communication network(s) 112 may include any or all of a private network, personal area network (PAN), Local-Area Network (LAN), Wide-Area Network (WAN), or the Internet. Further, the connection between the voice endpoint device 102, the voice endpoint server 106, the bridge interface device 108, or the chatbot server 110, and the communication network(s) 112 may be a wireless connection (e.g., Bluetooth, Wi-Fi connection, etc.), or a wired connection (e.g., Ethernet, universal serial bus (USB), etc.), or a combination thereof.

As referred to herein, a "voice endpoint" may be any device configured to provide voice-based virtual assistance. In some embodiments, the voice endpoint device 102 may include a user device including a voice endpoint application configured to provide voice based virtual assistance. Some examples of voice endpoints include Amazon Alexa Google Home®, Apple HomePod®, etc. Some examples of a user device include smart phones and mobile communication devices; tablet computing devices; wearable computing devices; desktops, laptops, netbooks and other portable computers and any other device capable of sending communications to the voice endpoint server 106.

As illustrated in FIG. 1, the user 104 may dictate the phrase "Camping Expo, is my funtrip backpack waterproof?" to the voice endpoint device 102. For instance, the user 104 may have purchased a product (i.e., the funtrip backpack) from a sporting goods store (i.e., Camping Expo), and endeavor to communicate with a chatbot operated by the sporting goods store to determine information about the product via the voice endpoint device 102. In response to the dictated phrase, the voice endpoint device 102 may send a device request 114 corresponding to the phrase to the voice endpoint server 106. In some embodiments, the voice endpoint device 102 may translate the audio capture of the phrase to textual information, and the device request 114 may include the textual information generated from the audio capture. In some other embodiments, the voice endpoint device 102 may send the audio capture of the phrase in the device request 114, and the voice endpoint server 106 may translate the audio capture of the phrase to textual information.

Upon receipt of the device request 114, the voice endpoint server 106 may determine that the device request 114 is associated with the bridge interface device 108, and send the device request 114 to the bridge interface device 108. In some embodiments, the voice endpoint server 106 may determine the device request 114 is associated with the bridge interface device 108 based on identifying that the device request 114 is related to a web service corresponding to the chatbot server 110. For example, the voice endpoint server 106 may determine that the device request 114 corresponds to the chatbot server 110 based on the dictated phrase including the keyword "Camping Expo." In some other examples, the voice endpoint server 106 may employ sentiment analysis to determine that a web service corresponding to the chatbot server 110 may be able to perform an action related to the dictated phrase.

Further, the bridge interface device 108 may process the device request 114 and generate a bot request 116 for the chatbot server 110. In some embodiments, the bridge interface device 108 may format the textual information of the device request 114 according to an application programming interface (API) associated with the chatbot server 110, and include the formatted textual information in the bot request 116. In some other embodiments, the bridge interface device 108 may translate the textual information of the device request 114 to a language associated with the chatbot server 110, and include the translated textual information in the bot request 116. In yet still some other embodiments, the bridge interface device 108 may identify authentication information associated with the user 104, and include the authentication information in the bot request 116. In addition, the bridge interface device 108 may administer a session between the voice endpoint device 102 and a chatbot server 110 by managing the transmission of multiple requests and responses between the voice endpoint device 102 and chatbot server 110.

Upon receipt of the bot request 116 from the bridge interface device 108, the chatbot server 110 may determine a bot response 118. In some embodiments, the bot response 118 may be determined by a chatbot application. The bot response 118 may include an answer to the query posed by the user 104. For example, the bot response 118 may include a query response indicating that the fun trip backpack is waterproof. Additionally, or alternatively, the bot response 118 may include one or more questions for the user 104 that the chatbot server application may need to assist the user 104. Once the bot response 118 is determined, the chatbot server 110 may send the bot response 118 to the bridge interface device 108.

Further, the bridge interface device 108 may process the bot response 118 to determine a device response 120. In some embodiments, the bridge interface device 108 may format the textual information according to an application programming interface (API) associated with the voice endpoint device 102, and include the formatted textual information in the device response 120. In some other embodiments, the bridge interface device 108 may translate the textual information of the device request 114 to a language associated with the voice endpoint device 102, and include the translated textual information in the device response 120. In yet still some other embodiments, the bridge interface device 108 may identify authentication information associated with the chatbot server 110, and include the authentication information in the device response 120.

Additionally, the bridge interface device 108 may transmit the device response 120 directly to the voice endpoint device 102. Alternatively, the bridge interface device 108 may send the device response 120 to the voice endpoint server 106 which may forward the device response 120 to the voice endpoint device 102. Upon receipt of the device response 120, the voice endpoint device 102 may reproduce audio corresponding to the device response 120. For example, as illustrated in FIG. 1, the voice endpoint device 102 may reproduce audio indicating to the user 104 that the fun trip backpack is waterproof.

Figure 2:
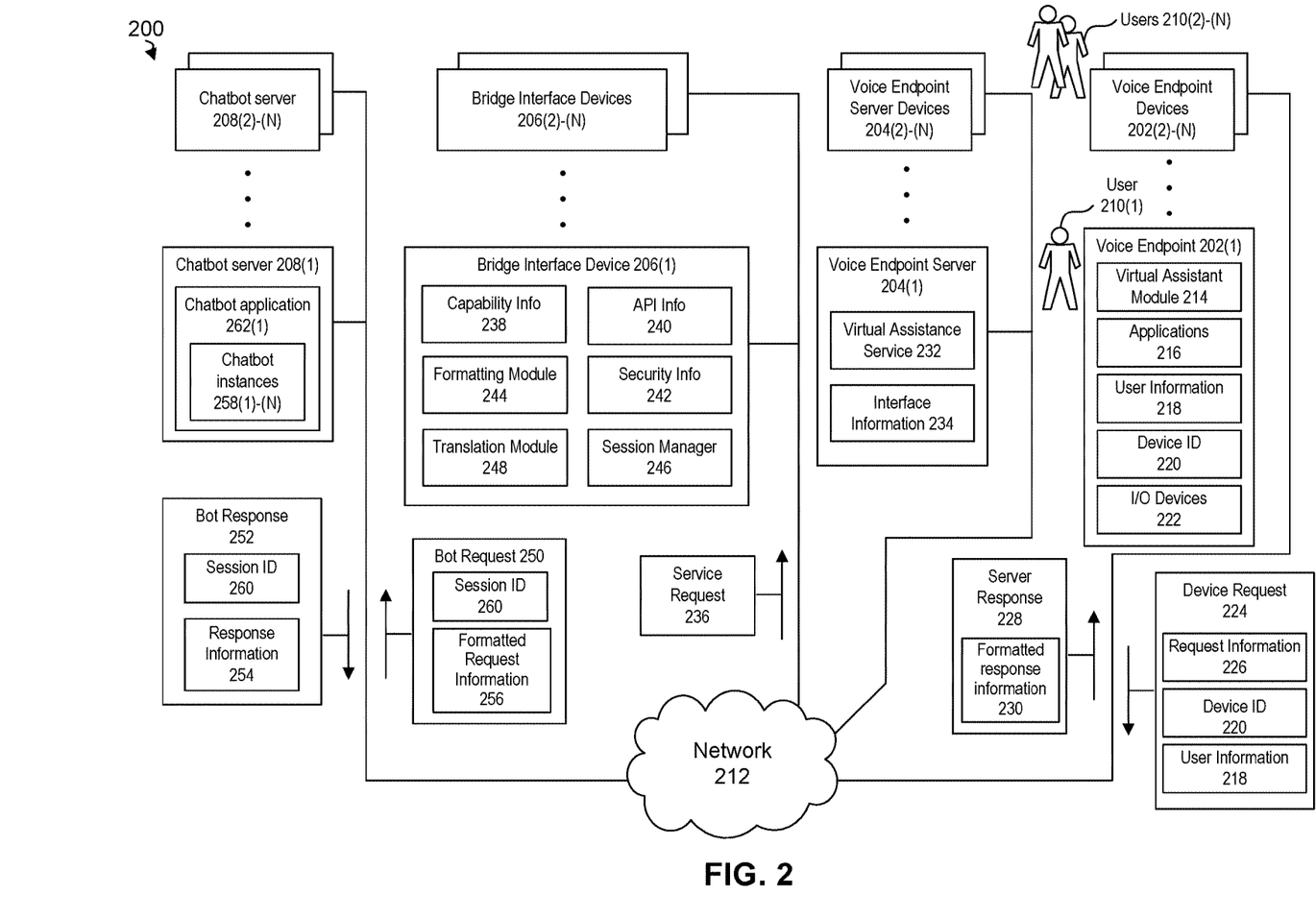
FIG. 2 illustrates a block diagram of an example framework for implementing a voice endpoint to chatbot bridge interface system, according to some embodiments.

FIG. 2 illustrates a block diagram of an example framework for implementing a voice endpoint to chatbot bridge interface system, according to some embodiments. As illustrated in FIG. 2, the system 200 includes a plurality of voice endpoint devices 202(1)-(N), a plurality of voice endpoint servers 204(1)-(N), a plurality of bridge interface devices 206(1)-(N), and a plurality of chatbot servers 208(1)-(N).

Further, the plurality of voice endpoint devices 202(1)-(N) may be associated with a plurality of users 210(1)-(N). For example, the first voice endpoint device 202(1) is associated with a first user 210(1), the second voice endpoint device 202(2) is associated with a second user 210(2), an Nth voice endpoint device 202(N) is associated with an Nth user 210(N), and so forth.

In some embodiments, a voice endpoint server 204 may be associated with a plurality of voice endpoint devices 202. For example, the voice endpoint server 204(1) may be associated with the voice endpoint devices 202(1) and 202(2). As such, the voice endpoint devices 202(1) and 202(2) may be configured to communicate with the voice endpoint server 204(1). In some examples, the voice endpoint server 204(1) may be associated with a company providing voice endpoint services via the voice endpoint devices 202(1) and 202(2), such as a manufacturer or seller of the voice endpoint devices 202(1) and 202(2). Further, the voice endpoint devices 202(1) and 202(2) may be located remotely from the voice endpoint server 204(1). For example, the voice endpoint device 202(1) may be located in a place of residence of the first user 210(1), and the voice endpoint server 204(1) may be located within a data center associated with the company providing voice endpoint services via the voice endpoint devices 202(1) and 202(2).

In some embodiments, the plurality of bridge interface devices 206(1)-(N) may be associated with the plurality of chatbot servers 208(1)-(N). For example, the first bridge interface device 206(1) is associated with a first chatbot server 208(1), the second bridge interface device 206(2) is associated with a second chatbot server 208(2), an Nth bridge interface device 206(N) is associated with an Nth chatbot server 208(N), and so forth. Additionally, or alternatively, a bridge interface device 206 may be associated with a plurality of chatbot servers 208. For example, the first bridge interface device 206(1) may be associated with the first chatbot server 208(1) and the second chatbot server 208(2).

Further, the plurality of voice endpoint devices 202(1)-(N), the plurality of voice endpoint servers 204(1)-(N), the plurality of bridge interface devices 206(1)-(N), and the plurality of chatbot servers 208(1)-(N) may communicate via a communication network(s) 212. The communication network(s) 212 may include any or all of a private network, personal area network (PAN), Local-Area Network (LAN), Wide-Area Network (WAN), or the Internet. Further, the connection between the voice endpoint devices 202(1)-(N), the voice endpoint servers 204(1)-(N), the bridge interface devices 206(1)-(N), or the chatbot servers 208(1)-(N), and the communication network(s) 212 may be a wireless connection (e.g., Bluetooth, Wi-Fi connection, etc.), or a wired connection (e.g., Ethernet, universal serial bus (USB), etc.), or a combination thereof.

As illustrated in FIG. 2, the voice endpoint device 202(1) includes a virtual assistance module 214, one or more applications 216(1)-(N), user information 218, a device identifier 220 that identifies the voice endpoint device 202(1), and one or more input/output (I/O) devices 222. The virtual assistance module 214 may include an operating system to provide virtual assistant functionalities to the user 210(1). Some examples of virtual assistance functionalities include voice interaction, music playback, setting alarms, streaming podcasts, playing audiobooks, task management, schedule management, and providing real-time information (e.g., weather, traffic, sports, financial information, etc.). In addition, the one or more applications 216 may be programmed to provide virtual assistance functionalities and additional services (e.g., games, trivia, customer service, sales information, technical support, appointment and scheduling services, etc.) to a user (e.g., the user 210(1)). As described in detail herein, the virtual assistance module 214 and/or the one or more applications 216(1)-(N) may employ the chatbot servers 208 to provide virtual assistant functionalities and other services to the user 210(1).

Additionally, the one or more applications 216 may configure the voice endpoint device 202(1) to identify particular actionable commands spoken by the user 210(1) and perform virtual assistant functionalities based on the identified commands. For example, the first application 216(1) may be associated with the actionable command "Housemaid." Further, the voice endpoint device 202(1) may perform one or more functions based on identifying the actionable command in a phrase uttered by the user 201(1). For example, the voice endpoint device 202(1) may determine that the phrase uttered by the user 210(1) includes the actionable command "Housemaid," and instruct an electronic cleaning device to performing a cleaning activity at the location of the voice endpoint device 202(1).

The user information 218 may include user data associated with one or more users (e.g., the user 210(1)) of the voice endpoint device 202(1). For example, the user information 218 may include authentication information, authorization information, user profiles, speech recognition information, user preferences, location information, usage history, etc. Further, the I/O devices 222 may include recording devices (e.g., microphones), speakers, sensors (e.g., temperature sensors, motion sensors, light sensors, etc.), and/or display devices.

In some embodiments, one or more of the recording devices 222 may capture audio uttered by the user 210(1) to the voice endpoint device 202(1). For example, the recording devices 222 may capture a phrase uttered by the user 210(1) including an actionable command associated with the bridge interface device 206(1) and/or the chatbot server 208(1). For example, the user 210 may utter the phrase "voice endpoint device, is my book bag from Camping Expo waterproof?" As a result, the voice endpoint device 202(1) may send the device request 224, including request information 226 (i.e., the audio capture of the uttered phrase), to the voice endpoint server 204(1).

Additionally, the speakers 222 may be configured to reproduce audio information. For instance, the voice endpoint device 202(1) may receive a service response 228 corresponding to the device request 224, and reproduce audio associated with information included within the service response 228 via the speakers 222. For example, the speakers 222 may reproduce audio indicating to the user 210(1) that the backpack is waterproof based on formatted response information 230 included in the service response 228.

Further, the display devices 222 may be configured to reproduce visual information. For instance, the voice endpoint device 202(1) may receive a service response 228 corresponding to the device request 224, and reproduce visual content associated with the formatted response information 230 included within the service response 228 via the display devices 222. For example, the display device 222 may display visual information indicating to the user 210(1) that the backpack is waterproof, and instructions for using the backpack in accordance with its waterproof capabilities.

As described herein, the virtual assistance module 214 may be configured to send the device request 224 to the voice endpoint server 204(1). For example, the virtual assistance module 214 may maintain communication information for transmitting the device request 224 to the voice endpoint server 204(1). Further, the virtual assistance module 214 may be configured to include the request information 226 (e.g., captured audio including an uttered request, or a user selection via a touch screen, etc.), the device identifier 220, and user information 218 within the device request 224. In some embodiments, the user information 218 may include authentication information identifying the voice endpoint device 202(1) or the user 210(1) to the voice endpoint server 204(1) and/or the bridge interface device 206(1).

In some embodiments, the virtual assistance module 214 may be configured to receive the service response 228 from the voice endpoint server 204(1). Further, the virtual assistance module may be configured to authenticate the service response 228, and reproduce the formatted response information 230 included within the service response 228 to the user 210(1) via the I/O devices 222. For example, the display device 222 may display visual information indicating to the user 210(1) that the backpack is waterproof, and instructions for using the backpack in accordance with its waterproof capabilities.

As illustrated in FIG. 2, the voice endpoint server 204(1) includes a virtual assistance service 232 and service information 234. The virtual assistance service 232 may be configured to receive the device request 224, and determine a service request 236 based on the device request 224. Further, the virtual assistance service 232 may send the service request 236 to the bridge interface device 206(1).

For example, the virtual assistance service 232 may translate the request information 226 (i.e., the audio capture) included in the device request 224 to textual information. In some embodiments, the virtual assistance service 232 may employ natural language speech to text and/or textual analysis algorithms to determine the textual information. Further, the virtual assistance service 232 may identify an actionable command within the textual information corresponding to the audio capture. Additionally, the virtual assistance service 232 may identify a voice endpoint web service (e.g., the chatbot server 208) associated with the device request 224. As an example, the virtual assistance service 232 may determine that the actionable command is associated with the chatbot server 208(1). As another example, the virtual assistance service 232 may identify an object and/or topic (e.g., a backpack) referenced in the audio capture, and determine that the subject and/or object are associated with the chatbot server 208(1).

In some embodiments, the virtual assistance service 232 may determine the voice endpoint web service corresponding to the device request 224 based upon the service information 234. For instance, the service information 234 may include a mapping of actionable commands to voice endpoint web services. Additionally, the service information 234 may include information that may be used to prepare the service request 236 for processing by bridge interface device 206(1).

For example, the service information 234 may include address information corresponding to the bridge interface device 206(1), and information describing the services offered by the bridge interface device 206(1) and/or chatbot server 208(1). In some embodiments, the service information 234 may include a model that may be used by the virtual assistance service 232 to determine which service (e.g., action, information, etc.) offered by the chatbot server 208(1) is being requested by the user 210(1) via the device request 224.

Additionally, the virtual assistance service 232 may generate the service request 236 according to an API associated with the voice endpoint server 204(1). In some embodiments, the service request 236 may identify a request type, the content of the request (e.g., the textual information corresponding to the audio capture), an identifier of the service request 236, session information corresponding to the service request 236 (e.g., information identifying whether service request is a part of an ongoing communication session between the voice endpoint device and the chatbot server), and authentication information associated with the user 210(1), voice endpoint device 202(1), and/or the voice endpoint server device 204(1). Once the virtual assistance service 232 generates the service request 236, the virtual assistance service 232 may send the service request 236 to the bridge interface device 206(1) using address information corresponding to the chatbot server 208(1) included in the service information 234.

Additionally, the virtual assistance service 232 may be configured to receive a service response 228 corresponding to the service request 236. In some embodiments, the voice endpoint server 204(1) may forward the service response 228 to the voice endpoint device 202(1). In some other embodiments, the voice endpoint server 204(1) may modify the service response 228 and send the modified service response 228 to the voice endpoint 202(1).

In some embodiments, the service information 234 may be provided by an operator of the bridge interface device 206(1) or the chatbot server 208(1). In some other embodiments, the service information 234 may be provided by the bridge interface device 206(1) during an automated registration process. Further, the service information 234 may correspond to a device functionality enabled by the user 210(1) at the voice endpoint 202(1). As an example, the user 210(1) may enable the "Camping Expo" customer assistance chat functionality via an application store associated with the voice endpoint 202(1). In response, the voice endpoint server 204(1) may be configured to detect actionable commands associated with the "Camping Expo" customer assistance chat functionality as set forth in the service information 234.

As illustrated in FIG. 2, the bridge interface device 206(1) includes capability information 238, API information 240, security module 242, a formatting module 244, a session management module 246, and a translation module 248. The capability information 238 may include data specifying the capabilities and functionalities of the different models of voice endpoint devices 202(1)-(N). For example, the capability information 238 may include data indicating whether the voice endpoint device 202(1) includes a display device. In some embodiments, the capability information 238 may include data identifying the I/O devices of individual voice endpoint devices 202(1)-(N) and/or any peripheral devices connected to the individual voice endpoint devices 202(1)-(N).

The API information 240 may include data describing the specifications, protocols, data structures and/or formats that may be used in communication with the chatbot server 208(1). For example, the API information 240 may specify the data format (e.g., XML, JSON, etc.) that may be used when sending a bot request 250 to the chatbot server 208(1). As another example, the API information 240 may specify the data (e.g., parameters, arguments, etc.) that may be included in the bot request 250 in order to submit a valid request to the chatbot server 208(1). For instance, the API information 240 may specify whether a request should include security information (e.g., token, password, certificate, etc.). In some other instances, the API information 240 may specify one or more spoken languages associated with the chatbot server 208(1). As yet another example, the API information 240 may specify the data that is included in a bot response 252 from the chatbot server 208(1). For instance, the API information 240 may specify the different types of responses generated by the chatbot server 208(1), and the data included in the particular types of responses.

The API information 240 may further include data describing the specifications, protocols, data formats and/or formats that may be used in communication with the voice endpoint devices 202(1)-(N) and/or the voice endpoint server devices 204(1)-(N). For example, the API information 240 may specify the data format (e.g., XML, JSON, etc.) that may be used when sending the service response 228 to the voice endpoint device 202(1). As another example, the API information 240 may specify the data that may be included in the service response 228 in order to submit a valid response to the voice endpoint device 202(1). For instance, the API information 240 may specify whether a response should include security information. In some other instances, the API information 240 may specify one or more languages associated with the voice endpoint device 202(1). As yet another example, the API information 240 may specify the format of the service request 236 received from the voice endpoint server device 204(1). For instance, the API information 240 may specify the different types of requests generated by the voice endpoint device 204(1), and the data included in the particular types of requests.

The security module 242 manages authentication information and authorization information for performing authentication and authorization of the voice endpoint devices 202(1)-(N), the voice endpoint servers 204(1)-(N), and any associated chatbot server 208. Some examples of authentication information include authentication credentials, user identifiers, device identifiers, passwords, certificates, cookies, tokens, etc. Some examples of authorization information include access control lists (ACLs), client capabilities, client device capabilities, security policy information, etc.

For instance, the security module 242 may authenticate the service request 236 received from the voice endpoint server device 206(1), and the bot response 252 received from the chatbot server 208(1). For example, the security module 242 may use authentication information (e.g., a public certificate) to determine that the service request 236 was sent by the voice endpoint server device 204(1). As another example, the security module 242 may use authentication information to determine that the bot response 252 was sent by the chatbot server 208(1).

In addition, the security module 242 may determine whether the service request 236 corresponds to authorized activity at the chatbot server 208(1). For example, the security module 242 may determine that the user 210(1) and/or voice endpoint device 202(1) is associated with the service request 236. Further, the security module 242 may determine whether the user 210(1), voice endpoint device 202(1), and/or voice endpoint server 204(1) is authorized to make a request of the chatbot server 208(1). Additionally, or alternatively, the security module 242 may determine whether the user 210(1) and/or voice endpoint device 202(1) is authorized to make a request for a particular type of interaction with the chatbot server 208(1). For instance, the security module 242 may determine that service request 236 corresponds to a request for a premium service offered by the chatbot server 208(1). In response, the bridge interface device 206(1) may determine whether the user 210(1) is authorized to access the premium service. In some other instances, the bridge interface device 206(1) may determine whether the requested interaction is permitted based at least in part on one or more attributes of the user 210(1). Some examples of user attributes include age, location, demographic, account status, account privileges, account activity, etc.

Additionally, the security module 242 may be responsible for encrypting and decrypting communications between the voice endpoint device 202(1), voice endpoint server device 206(1), and the chatbot server 208(1). For example, the bridge interface device 206(1) may decrypt the request information 226 of the service request 236 based on decryption information and an encryption protocol associated with the voice endpoint server 204(1). Further, the bridge interface device 206(1) may encrypt the decrypted request information 226 based on encryption information and an encryption protocol associated with the chatbot server 208(1). Further, the re-encrypted request information may be included in the bot request 250. As another example, the bridge interface device 206(1) may decrypt the response information 254 included in the bot response 252 based on decryption information and an encryption protocol associated with the chatbot server 208(1). Further, the bridge interface device 206(1) may encrypt the decrypted response information 254 based on encryption information and an encryption protocol associated with the voice endpoint device 202(1) and/or the voice endpoint server 204(1). Further, the re-encrypted response information 230 may be included in the service response 228.

The formatting module 244 may generate the bot request 250 based at least in part on the service request 236. As illustrated in FIG. 2, the bot request 250 may include the formatted request information 256. In some embodiments, the formatting module 244 may determine the formatted request information 256 based on converting the request information 226 from a format associated with the voice endpoint server 204(1) to a format associated with the chatbot server 208(1). Further, the formatting module 244 may convert the request information 226 using a format described in the API information 240.

In some other embodiments, the formatting module 244 may determine the bot request 250 based on the security module 242. For example, the API information 240 may indicate that the bot request 250 requires authentication information (e.g., security token) identifying the user 210(1) and/or the voice endpoint device 202(1) to the chatbot server 208(1), the formatting module 244 may determine authentication information associated with the user 210(1) and include the authentication information within bot request 250. In yet still some other embodiments, the formatting module 244 may employ the translation module 248 to translate the request information 226 included in the service request 236 from a first language associated with the voice endpoint device 202(1) to a second language associated with the chatbot server 208(1). In some instances, the API information 240 may indicate the one or more languages associated with the chatbot server 208(1).

In addition, the formatting module 244 may generate the service response 228 based at least in part on the bot response 252. As illustrated in FIG. 2, the service response 228 may include the formatted response information 230. In some embodiments, the formatting module 244 may determine the formatted response information 230 based on converting the bot response 252 from a format associated with the chatbot server 208(1) to a format associated with the voice endpoint server 204(1). Further, the formatting module 244 may convert the response information 254 to the formatted response information 230 using a format described in the API information 240.

In some other embodiments, the formatting module 244 may determine the service response 228 based on the security module 242. For example, the API information 240 may indicate that the service response 228 requires authentication information (e.g., security token) identifying the chatbot server 208(1) to the voice endpoint device 202(1), the formatting module 244 may determine authentication information associated with the chatbot server 208(1) and include the authentication information within service response 228. In yet still some other embodiments, the formatting module 244 may employ the translation module 248 to translate the response information 254 from a first language associated with the chatbot server 208(1) to a second language associated with the voice endpoint device 202(1). In some instances, the API information 240 may indicate the one or more languages associated with the voice endpoint device 202(1).

Further, the formatting module 244 may generate the service response 228 based at least in part on the capability information 238. For example, if the capability information 238 associated with the voice endpoint device 202(1) indicates that the voice endpoint device 202(1) does not have a display device, the formatting module 244 may not include visual information included within the bot response 252 in the service response 228. Additionally, or alternatively, the formatting module 244 may include a textual description of the visual information within the service response 228. In some examples, the textual description of the visual information may be generated based on metadata associated with the visual information. In some other examples, the formatting module 244 may employ a machine learning techniques (e.g., a neural network) to determine textual descriptions of the visual information.

As described in detail above, the translation module 248 may translate request information 226 in the service request 236 from a first language to a second language. Additionally, the translation module 248 may translate response information 254 in a bot response 252 from a first language to a second language. In some embodiments, the translation module 248 may include one or more machine learning models associated with language translation.

The session management module 246 manages communication sessions between the voice endpoint devices 202(1)-(N) and the chatbot server 208(1). For instance, the chatbot server 208(1) may be configured to conduct a conversation with a user 210(1). As such, the session management module 246 may generate and manage a session between the voice endpoint device 202(1) and the chatbot server 208(1) that ensures that the voice endpoint device 202(1) may be used to conduct chat communications with the chatbot server 208(1). This may be necessary in instances where the voice endpoint device 202(1) is configured for merely submitting a query and receiving a response or the voice endpoint device 202(1) is configured with a timeout value lesser than a timeout value of a chat conversation with the chatbot server 208(1).

In some embodiments, the session management module 246 may create a mapping between a chatbot instance 258(1) of the chatbot server 208(1) and the voice endpoint device 202(1). Further, the session management module 246 may cause the bridge interface device 206(1) to route requests to the chatbot instance 258(1) and responses to the voice endpoint device 202(1) based on the mapping.

For example, the session management module 246 may generate a session identifier 260 when it receives the service request 236 from the voice endpoint server device 204(1). In addition, the session management module 246 may associate the session identifier 260 with the chatbot instance 258(1) of the chatbot server 208(1) and the voice endpoint device 202(1). Further, the bridge interface device 206(1) may include the session identifier 260 in the bot request 250. When the bridge interface device 206(1) receives bot responses (e.g., the bot response 252) including the session identifier 260, the bridge interface device 206(1) may send the service response 228 based on corresponding to the bot response 252 to the voice endpoint device 202. Further, in some embodiments, the session management module 246 may map session identifier to a chat communication identifier provided by the chatbot instance of the chatbot server 208(1). Further, the session management module 246 may include the communication identifier in a bot request 250 to indicate to the chatbot server 208(1) that the bot request 250 is associated with the previous chatbot instance 258(1) of the chatbot server.

In some embodiments, the session management module 246 may monitor whether the bot responses (e.g., the bot response 250) is a question or message. Further, the session management module 246 may end management of a conversation based upon determining that a bot response is not a question. In some embodiments, the session management module 246 may determine that the bot response 250 is a question based upon an indicator included in the bot response 250. In some other embodiments, the session management module 236 may employ machine learning techniques to determine whether the bot response 250 includes information indicative of the end of a chat conversation. For example, the session management module 246 may be training to identify words and/or phrases indicative the end of a conversation.

As illustrated in FIG. 2, the chatbot server may include a chatbot application 262 that generates a plurality of chatbot instances 258(1)-(N). Further, each chatbot instance 258 may be configured to conduct intelligent conversation with the users 210 via auditory, textual, and/or graphical means. For example, the chatbot instance 258(1) may operate in accordance with predefined business rules, scripts and artificial intelligence thru a conversational interface. In some embodiments, the chatbot instances 258(1)-(N) are configured to receive textual requests (e.g., bot request 250) and provide responses (e.g., bot response 252) to the textual requests. Further, the chatbot instances 258(1)-(N) may employ machine learning algorithms (e.g., Bayesian algorithms and neural networks) to determine the responses.

In some embodiments, the chatbot servers 208(1)-(N) may be embedded chat instances within a multi-tenant framework. Further, some of the resources accessed by the embedded chat instances may reside at a multi-tenant server physically or logically separate from the chatbot servers 208(1)-(N). As used herein, the term "multi-tenant system" refers to those systems in which various elements of hardware and software of the system may be shared by one or more customers of the multi-tenant system operator.

For example, the operators of chatbot servers 208(1)-(N) may be customers of the multi-tenant server. Further, the multi-tenant server may provide the application code for the chatbot application and/or operate the bridge interface devices 206(1)-(N). As such, the multi-tenant system operator may configure the chatbot applications 262 to interface with the independently operated voice endpoint server 204 via the bridge interface devices 206(1)-(N). Thereby, providing the chatbot servers 208(1)-(N) technical compatibility with independent and ubiquitous consumer devices without having to manually code solutions for each individual type of voice endpoint device 202(1)-(N). As such, the bridge interface devices 208 present a simpler and more efficient means of implementing an interface between a voice endpoint 202(1) and the chatbot server 208(1). Moreover, the bridge interface devices 206(1)-(N) improve the usability and accessibility of the voice endpoint device 202(1)-(N) and chatbot servers 208(1)-(N) by connecting two independent technologies that offer complimentary services.

Figure 3:
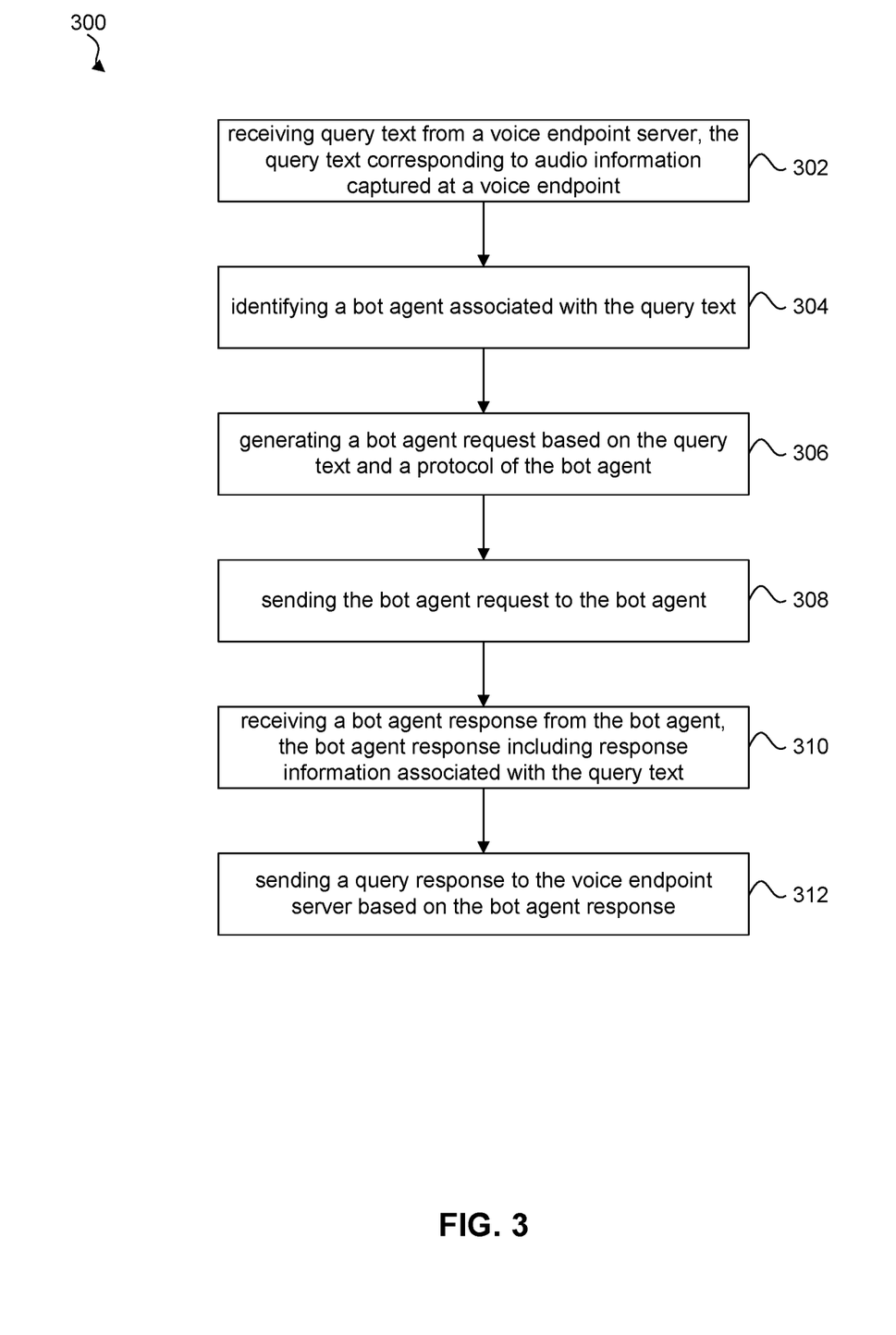
FIG. 3 is a flowchart illustrating example operations for implementing a voice endpoint to chatbot bridge interface system, according to some embodiments.

FIG. 3 illustrates an example method 300 for implementing a voice endpoint to chatbot bridge interface system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to the example embodiments.

At 302, the bridge interface device receives query text from a voice endpoint server, the query text corresponding to audio information captured at a voice endpoint. For example, the user 210(1) may utter the phrase "voice endpoint device, is my book bag from Camping Expo waterproof?," and the voice endpoint device 202(1) may record the phrase. Additionally, the voice endpoint device 202(1) may send the device request 224 including the audio capture 226 of the phrase to the voice endpoint server 204(1).

Upon receipt of the device request 224, the voice endpoint server 204(1) may determine textual information corresponding to the audio capture 226. Further, the voice endpoint server 204(1) may identify that the textual information represents a request intended for the chatbot server 208(1). In response, the virtual assistance service 232 may generate a service request 236 based on an API of the voice endpoint server 204(1) and the service information 234 corresponding to the bridge interface device 206(1). In addition, the virtual assistance service 232 may send the service request 236, including the textual information corresponding to the audio capture 226, to the bridge interface device 206(1).

At 304, the bridge interface device identifies a bot agent associated with the query text. For example, the formatting module 244 may identify that the service request 236 is associated with the chatbot server device 208(1). In some embodiments, the formatting module 244 may identify the chatbot server 208(1) as the voice endpoint service associated with the service request 236 in accordance. For instance, the formatting module may determine the service request 236 is associated with the chatbot server based on a request type of the service request 236, the content of the service request 236, an identifier of the service request 236, and/or session information corresponding to the service request 236.

At 306, the bridge interface device generates a bot agent request based on the query text and a protocol of the bot agent. For example, the formatting module 244 may determine the bot request 250 based on the textual representation of the service request and the API information corresponding to the chatbot server 208(1).

In some embodiments, the bridge interface device 206(1) may format the textual information of the service request 236 according to an application programming interface (API) associated with the chatbot server 208(1), and include the formatted request information 256 in the bot request 250. In some other embodiments, the bridge interface device 206(1) may translate the textual information of the service request 236 to a language associated with the chatbot server 208(1), and include the translated textual information as formatted request information 256 in the bot request 250. In yet still some other embodiments, the bridge interface device 206(1) may identify authentication information associated with the user 210(1), and include the authentication information in the bot request 250.

At 308, the bridge interface device sends the bot agent request to the bot agent. For example, the bridge interface device 206(1) may send the bot request 250 to the chatbot server 208(1).

At 310, the bridge interface device sends a query response to the voice endpoint device based on the bot agent response. For example, the bridge interface device 206(1) may determine the service response 228 based on the bot response 252, and send the service response 228 to the voice endpoint device 202(1).

In some embodiments, the bridge interface device 206(1) may determine the formatted response information 230 based on the response information 254 and an API associated with the voice endpoint device 202(1). Further, the bridge interface device 206(1) may send the service response 228, including the formatted response information 230, to the voice endpoint 202. In some other embodiments, the bridge interface device 206(1) may translate textual information of the response information 254 to a language associated with the voice endpoint device 202(1). Further, the bridge interface device 206(1) may send the service response 228, including the translated textual information as the formatted response information 230, to the voice endpoint 202(1).

Figure 4:
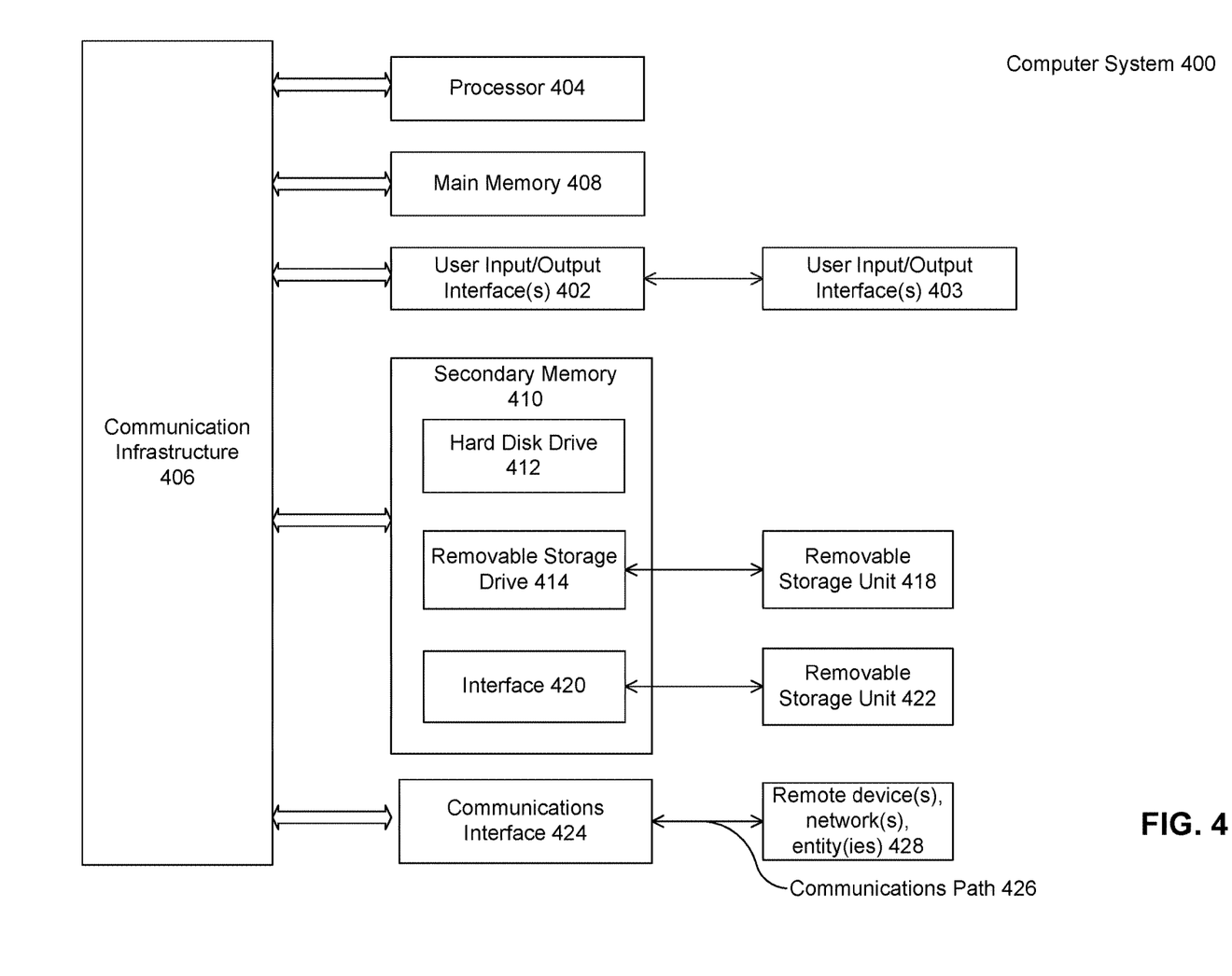
FIG. 4 is an example computer system useful for implementing various embodiments.

Various embodiments may be implemented, for example, using one or more well-known computer systems, such as voice endpoints 102 and 202(1)-(N), voice endpoint server 106 and 204(1)-(N), bridge interface devices 108 and 206 (1)-(N), chatbot servers 110 and 208(1)-(N) shown in FIGS. 1 and 2. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving query text from a voice endpoint server, the query text corresponding to audio information captured at a voice endpoint;
identifying a bot agent associated with the query text;
determining a protocol format based on an attribute of the bot agent;
determining request information based on formatting the query text based on the protocol format;
generating a bot agent request based on the query text and the protocol format of the bot agent; sending the bot agent request to the bot agent, wherein the bot agent request includes the request information;
receiving a bot agent response from the bot agent, the bot agent response including response information associated with the query text; and
sending a query response to the voice endpoint based on the bot agent response.

2. The method of claim 1, further comprising:
generating a session identifier associated with the query text, wherein at least one of the bot agent request and the bot agent response include the session identifier.

3. The method of claim 1, wherein generating the bot agent request comprises:
determining a bot agent language based on the attribute of the bot agent; and
determining bot request text based on translating the query text from a query request language to the bot agent language, wherein the bot agent request includes the bot request text.

4. The method of claim 1, wherein generating the bot agent request comprises:
determining a user identifier associated with the query text; and
determining a user credential based on the user identifier and the bot agent, wherein the bot agent request includes the user credential.

5. The method of claim 1, wherein sending the query response to the voice endpoint comprises:
determining the protocol format further based on an attribute of the voice endpoint server; and
determining query response information based on formatting the query text based on the protocol format, wherein the bot agent request includes the query response information.

6. The method of claim 1, wherein sending the query response to the voice endpoint comprises:
determining an attribute of the voice endpoint; and
generating the query response by modifying the bot agent response based on the attribute of the voice endpoint.

7. A system, comprising:
a memory;
one or more processors and/or circuits coupled to the memory and configured to:
receive query text from a voice endpoint server, the query text corresponding to audio information captured at a voice endpoint;
identify a bot agent associated with the query text;
determine a protocol format based on an attribute of the bot agent;
determine request information based on formatting the query text based on the protocol format;
determine a bot agent request based on the query text and the protocol format of the bot agent, wherein the bot agent request includes the request information;
send the bot agent request to the bot agent;
receive a bot agent response from the bot agent, the bot agent response including response information associated with the query text; and
send a query response to the voice endpoint server based on the bot agent response.

8. The system of claim 7, wherein the one or more processors and/or circuits are further configured to generate a session identifier associated with the query text, wherein at least one of the bot agent request and the bot agent response include the session identifier.

9. The system of claim 7, wherein to determine the bot agent request, the one or more processors and/or circuits are further configured to:
- determine a bot agent language based on the attribute of the bot agent; and
- determine bot request text based on translating the query text from a query request language to the bot agent language, wherein the bot agent request includes the bot request text.

10. The system of claim 7, wherein to determine the bot agent request, the one or more processors and/or circuits are further configured to:
- determine a user identifier associated with the query text; and
- determine a user credential based on the user identifier and the bot agent, wherein the bot agent request includes the user credential.

11. The system of claim 7, wherein to send the query response to the voice endpoint, the one or more processors and/or circuits are further configured to:
- determine an attribute of the voice endpoint; and
- generate the query response by modifying the bot agent response based on the attribute of the voice endpoint.

12. A non-transitory computer-readable device having instructions stored thereon that, when executed by at least one computing device, cause the at least one computing device to perform operations comprising:
- receiving query text from a voice endpoint server, the query text corresponding to audio information captured at a voice endpoint;
- identifying a bot agent associated with the query text;
- determining a protocol format based on an attribute of the bot agent;
- determining request information based on formatting the query text based on the protocol format;
- determining a bot agent request based on the query text and the protocol format of the bot agent, wherein the bot agent request includes the request information;
- sending the bot agent request to the bot agent;
- receiving a bot agent response from the bot agent, the bot agent response including response information associated with the query text; and
- sending a query response to the voice endpoint server based on the bot agent response.

13. The non-transitory computer-readable device of claim 12, the operations further comprising:
- generating a session identifier associated with the query text, wherein at least one of the bot agent request and the bot agent response include the session identifier.

14. The non-transitory computer-readable device of claim 12, wherein determining the bot agent request comprises:
- determining a bot agent language based on the attribute of the bot agent; and
- determining bot request text based on translating the query text from a query request language to the bot agent language, wherein the bot agent request includes the bot request text.

15. The non-transitory computer-readable device of claim 12, wherein determining the bot agent request comprises:
- determining a user identifier associated with the query text; and
- determining a user credential based on the user identifier and the bot agent, wherein the bot agent request includes the user credential.

16. The non-transitory computer-readable device of claim 12, wherein sending the query response to the voice endpoint comprises:
- determining the protocol format further based on an attribute of the voice endpoint server; and
- determining query response information based on formatting the query text based on the protocol format, wherein the bot agent request includes the query response information.

17. The non-transitory computer-readable device of claim 12, wherein sending the query response to the voice endpoint comprises:
- determining an attribute of the voice endpoint; and
- generating the query response by modifying the bot agent response based on the attribute of the voice endpoint.

* * * * *